Dec. 31, 1929.   M. W. TILNEY   1,741,592
AUTOMOBILE BED
Filed Sept. 30, 1924   2 Sheets-Sheet 1

INVENTOR
Merritt W. Tilney
BY
G. Wright Arnold
ATTORNEY

Dec. 31, 1929.　　　　　M. W. TILNEY　　　　　1,741,592
AUTOMOBILE BED
Filed Sept. 30, 1924　　　2 Sheets-Sheet 2
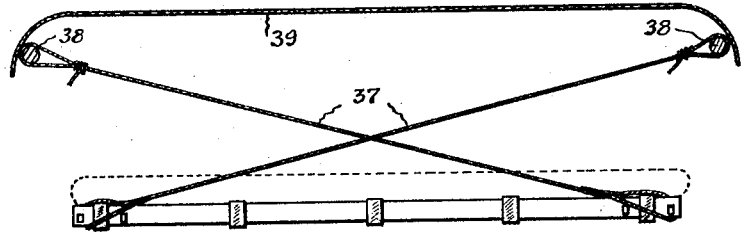
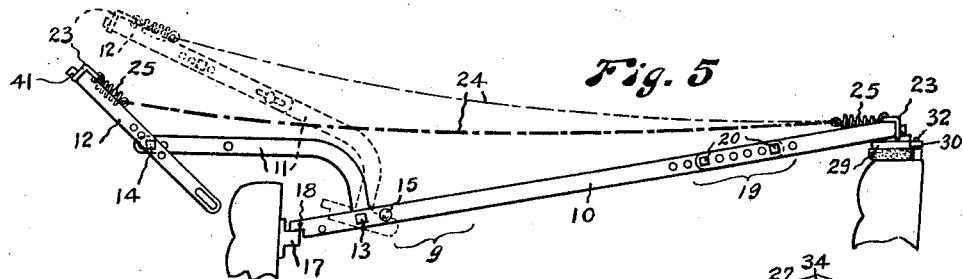
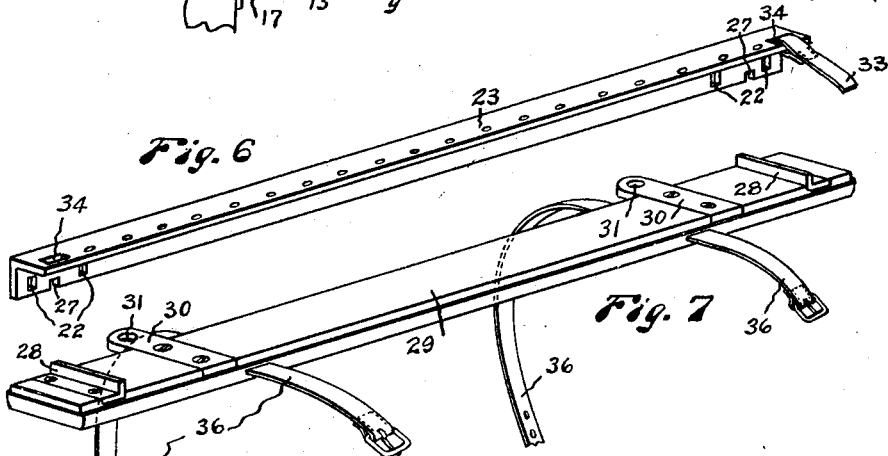
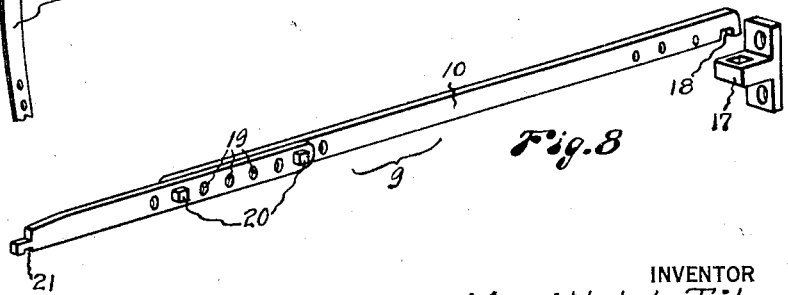
INVENTOR
Merritt W. Tilney
BY
G. Wright Arnold
ATTORNEY Patented Dec. 31, 1929

1,741,592

UNITED STATES PATENT OFFICE

MERRITT W. TILNEY, OF SEATTLE, WASHINGTON

AUTOMOBILE BED

Application filed September 20, 1924. Serial No. 740,712.

My invention relates to an automobile bed. More particularly, my invention relates to an automobile bed of the type to be set up within the automobile itself.

The advantages of an automobile bed, designed to be set up in the machine itself, are recognized by the automobile tourist. It may be readily set up at the end of a trip where hotel accommodations may be difficult to obtain, and may be readily set up during a rain without the equipment becoming dampened. The delay and trouble incident to the setting up of a separate tent or shelter are rendered entirely unnecessary by this type of bed.

Beds of this type, as heretofore designed, often employ the seat cushions as the mattress. Objection obtains to the use of the cushions in view of the fact that other equipment may be packed in the car, which makes access to the said cushions difficult, and, furthermore, they are not easy to move about on account of their weight and size. Often it is desirable to drive the car without taking the bed entirely down, and for this reason it is necessary to have the front seat cushion, at least, available for its regular use. A primary object of my invention is to provide an automobile bed of the type to be set up within the car itself, which does not involve the use of the seat cushions to constitute the mattress.

A further primary object of my invention is to provide a bed of the type described, having a part of the side rail mounted in such a manner as to constitute a convenient lever means or stretching means for putting the flexible bed member under such degree of tension as will cause the said member to constitute a spring and mattress combined.

A further primary object is to provide such a bed that the same may be partly taken down and the front seat left clear for driving purposes, without taking the bed entirely down.

Another object of my invention is to provide an automobile bed of the type specified, which will not mar the car nor weaken or strain any of the parts thereof.

Still of further primary object of my invention is to provide a bed of the type specified, which will stay fixed in position, and particularly will be comfortable, having minimum parts, and will be light as respects its weight, so as to be readily portable.

The above mentioned general objects of my invention, together with others inherent in the same, are attained by the device illustrated in the following drawings, the same being merely a preferred exemplary form of embodiment of my invention, throughout which drawings like reference numerals indicate like parts:

Fig. 4 is a view of the front of the same in elevation;

Fig. 5 is a view in side elevation of said bed in process of setting-up;

Fig. 6 is a view in perspective of a detail of the same;

Fig. 7 is a view in perspective of another detail; and

Fig. 8 is a view in perspective of one of the bed base rail members and supporting bracket.

Figure 1:
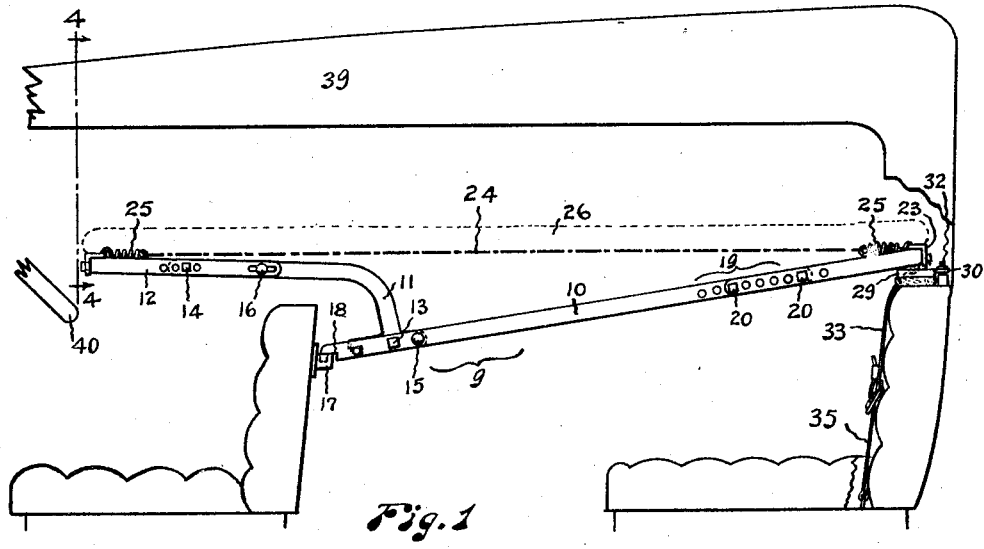
Figure 1 is a view in side elevation of an automobile bed embodying my invention set up in an automobile body.
Figure 2:
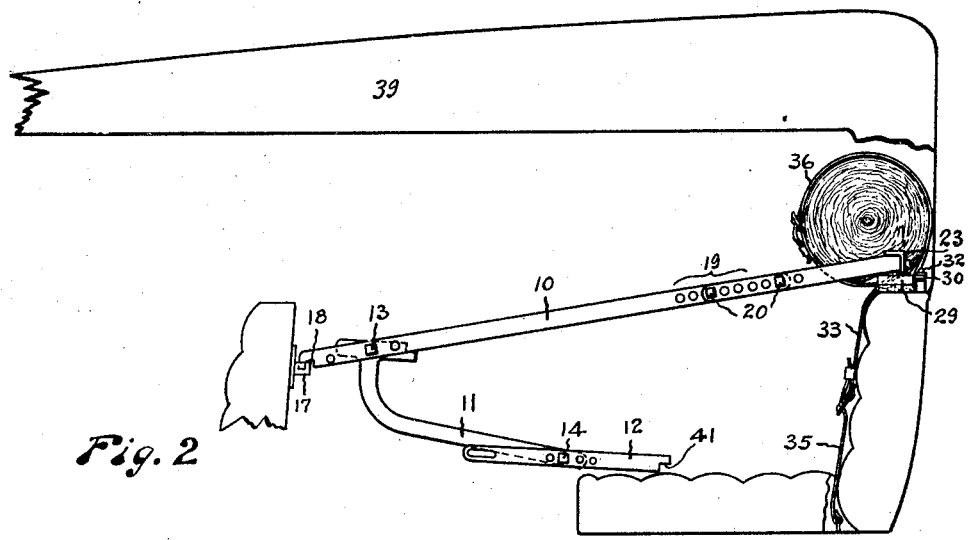
Fig. 2 is a view of the same partly demounted, so that the front seat is clear.
Figure 3:
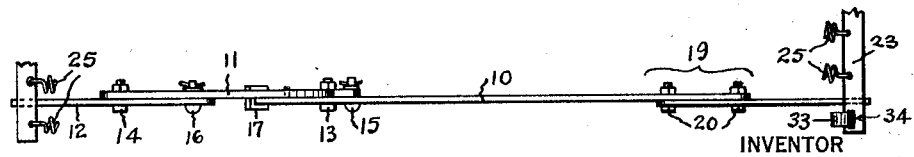
Fig. 3 is a top view of one of the side rails.

Two side rail members 9, i. e., one on each side of the automobile, are disposed from the back of the rear seat to the back of the front seat,—said side rail members are preferably composed of a base member 10, a forwardly extending arm 11 and a lever arm 12. The arm 11 is preferably pivotally mounted at 13 upon the base member 10, while the lever arm 12 is preferably pivoted upon the forwardly projecting arm at 14. Bolts 15 and 16 are preferably provided to maintain said arms respectively in locked position. The base member 10 is provided with a supporting means or bracket 17 on the back of the front seat. The end portion of the base member 10 may have a notch 18, whereby the same may engage the supporting means 17 and maintain the side rail in upright position. The base member 10 may be provided with an adjustable section 19 having securing bolts 20, so that its length may be altered to fit different makes of cars. The opposite end portion of the base member 10 may likewise be provided with a notch 21, to engage the slot 22 in the rigid end mounting means 23 of the flexible bed member 24. The flexible bed member 24 preferably consists of a piece of water-proof canvas having a series of spiral springs 25 at each end, which springs when under tension permit the canvas to stretch or yield, so that the comfort of the occupant may be provided. The said bed member may also have sewed upon said canvas a thin mattress body 26. This flexible bed member 24 is designed to constitute the sole body support, that is, with my bed no cushions are necessary. The spiral springs 25 are relatively very strong and stiff, and I provide special lever means which permits these being put under proper tension to constitute the flexible member, the sole body support. Wherever the term "sole body support" occurs herein it is intended to convey the idea that the seat cushions are not employed to form the mattress of my bed.

The rigid end mounting means 23 are provided with notches 27, which fit upon the upturned flanges 28 of the supporting board 29. This board is adapted to rest upon the top of the back of the rear seat, and may be provided with brackets 30 having holes 31 as means to engage upstanding lugs 32 fixedly secured in the back of said rear seat, whereby said board may be held in place, so far as lateral displacement is concerned. The rigid end mounting means 23 are provided with straps 33 in slot 34 to engage straps 35, which are secured to the rear seat base, so that said rigid end mounting means may be securely strapped down, thereby preventing any displacement of said bed upwardly. This arrangement also holds the board 29 securely upon the top of the back of the rear seat. Obviously, this board protects the upholstery and distributes evenly the weight of the bed over the top of the back seat, and prevents any marring which otherwise might result. Said board may also be provided with straps 36, which are adapted to hold the flexible bed member in rolled-up condition, and thus these parts are kept together. Cords 37 may be provided for the front end of the bed to prevent any side movement. These cords may be caused to cross each other and extend from the front rigid end mounting means 23 to the lateral frame members 38 of the top 39, or, obviously, said means might be secured to the steering wheel 40.

The mode of operation of an automobile bed embodying my invention is as follows:

The board 29 is placed on the back of the rear seat with lugs 32 embraced by brackets 30, and then the bed member 24 with its rigid end mounting means 23 is placed in position. Normally, the said board 29 and said bed member 24 would be bound together as above set forth. Next, the base member 10 of the side rail is placed in position with the notch 18 in operative engagement with bracket 17, and the opposite end is caused to be inserted in opening 22 in the end member 23. Thereupon, strap 33 is connected with strap 35 and the rear end of the bed is thus secured in fixed position. Then, the forwardly projecting arm 11 is swung forwardly and held in locked position by means of bolt 15. Next, the flexible bed member 24 is unrolled and the forward rigid end mounting means 23 is caused to engage notch 41 of the lever arm 12, which is then depressed until lock nut 16 may be inserted to hold the same in locked position. Obviously, this disposition of the lever arm 12 constitutes the same a stretching means for the flexible bed member 24, and makes unnecessary the well-known complex and equivalent arrangements such as a roll provided with a ratchet which must be operated by means of a crank.

Obviously, changes may be made in the form, dimensions, and arrangement of the parts of my invention, without departing from the principle thereof, the above setting forth only a preferred form of embodiment. The device embodying my invention has been illustrated as employing bar iron, but steel tubing might well be substituted, as well as angle iron or combinations of the same. Also, obviously, the flexible bed member might be made of bed spring material, and applicant has so made said member.

I claim:—

1. In combination with an automobile bed of the class described, the combination of a flexible bed member having rigid end mounting means which has means to secure the same to the automobile, and a protective board having straps to secure said flexible bed member in rolled-up condition, and also having means to engage said rigid end means, whereby lateral displacement as respects the said rigid end mounting means and said board is prevented.

2. An automobile bed of the class described embodying; bracket supporting means secured on the back of the front seat; a supporting board releasably attached to the top of the back of the rear seat, said board having strap means whereby parts of said bed may be maintained in a rolled up condition when not in use; a foot and a head rigid mounting means, said head mounting means being releasably secured on the top of the back of the rear seat; a flexible bed member secured to said mounting means through a plurality of springs said member constituting solely the body support; and side rails on each side of said bed, each of said rails embodying a base member which rests as respects the rear end portion on said supporting board, whereby the load on said base member is distributed on the top of said back of the rear seat, said base member extending from the top of the back of the rear seat to said bracket supporting means and hooked therein, an arm extending over the front seat releasably rigidly mounted on each of said base members, a lever stretching means pivotly mounted upon said arm, said means having a connecting prong to receive said foot rigid mounting means and a locking member whereby said lever may be fixedly held upon said arm, whereby said flexible bed member may be put under tension and so maintained thereby rendering said foot portion of said bed self-supporting and said flexible bed member a suitable body support.

3. An automobile bed of the class described embodying bracket supporting means secured on the back of the front seat; a foot and a head rigid mounting means; a flexible bed member secured to said mounting means through a plurality of springs; side rails on each side of said bed extending from the head to the foot of the bed, each of said rails embodying, first, a base member extending downwardly from the top of the back of the rear seat to said bracket supporting means and hooked therein, said downwardly inclined position operating to anchor said base member in said bracket, secondly, an arm extending over the front seat releasably rigidly mounted on each of said base members, and, third, a lever stretching means pivotally mounted upon said arm, said means having a connecting means for said rigid foot mounting means and a locking member whereby said lever may be fixedly held upon said arm whereby said flexible bed member may be put under tension and so maintained, thereby rendering said foot portion of said bed self-supporting and said flexible bed member a suitable body support; a board having seating means disposed upon the top of the back of the rear seat, on which board said head rigid member is mounted; means on said board which prevent lateral displacement of said head rigid mounting means; and anchoring means secured to said head rigid mounting means which holds said means down upon said board and to said top of the back of said rear seat, whereby tendency of said bed to tilt about said bracket is prevented.

4. In combination with an automobile bed of the class described, a supporting upholstery-protecting board disposed on top of the back of the rear seat, said board having anchoring means whereby the same may be held in fixed position on the top of said back of said rear seat, and means on said board whereby said bed may be engaged and held against lateral movement.

5. In combination with an automobile bed of the class described having a flexible bed member, a supporting upholstery-protecting board disposed on top of the back of the rear seat, said board having anchoring means whereby the same may be held in fixed position on the top of said back of said rear seat; means on said board whereby said bed may be engaged and held against lateral movement; and straps carried by said board whereby said flexible bed member may be held in rolled-up position.

6. An automobile bed of the class described embodying side rails on each side thereof each of said rails consisting of (a) a base member, (b) a forwardly extending arm member releasably rigidly mounted upon said base member, and (c) a lever stretching means mounted upon said forwardly extending arm; bracket supporting means for the front end portion of said rail base members mounted on the rear side of the back of the front seat; a supporting-upholstery-protecting board disposed on top of the back of the rear seat entirely inside the automobile, said board having means whereby the rear end portions of said rail base members may be supported and anchored against lateral movements; and a flexible bed chamber releasably mounted as respects one end thereof upon said rail base members, and as respects the other end thereof upon said lever stretching means, whereby said flexible bed member may be put under tension and so maintained.

In witness whereof, I hereunto subscribe my name this 23d day of September, 1924.

MERRITT W. TILNEY.